(12) United States Patent
Comte et al.

(10) Patent No.: US 11,751,535 B2
(45) Date of Patent: Sep. 12, 2023

(54) HEAD GATE FOR A CATTLE CONTAINMENT CHUTE

(71) Applicant: Comte Industries Limited, Notre Dame de Lourdes (CA)

(72) Inventors: Alain Gerald Comte, Notre Dame de Lourdes (CA); Allan R Delorme, Lavenham (CA); Yvan Delaquis, Notre Dame de Lourdes (CA)

(73) Assignee: Comte Industries Limited, Notre Dame de Lourdes (CA)

( * ) Notice: Subject to any disclaimer, the term of this patent is extended or adjusted under 35 U.S.C. 154(b) by 114 days.

(21) Appl. No.: 17/542,732

(22) Filed: Dec. 6, 2021

(65) Prior Publication Data

US 2023/0172159 A1    Jun. 8, 2023

(51) Int. Cl.
*A01K 1/06*    (2006.01)
*A01K 1/062*   (2006.01)

(52) U.S. Cl.
CPC .................................... *A01K 1/062* (2013.01)

(58) Field of Classification Search
CPC ...................................................... A01K 1/00
See application file for complete search history.

(56) References Cited

U.S. PATENT DOCUMENTS

| 194,652 A | 8/1877 | Corbin |
|---|---|---|
| 206,262 A | 7/1878 | Reed |
| 658,128 A | 9/1900 | Smith |
| 730,049 A | 6/1903 | Sage |
| 1,166,450 A | 1/1916 | Dolan |
| 1,621,760 A | 3/1927 | Stader |
| 2,408,872 A | 10/1946 | Newbold |
| 2,730,072 A | 1/1956 | Firkins |
| 2,778,334 A | 1/1957 | Moore |
| 3,043,269 A | 7/1962 | Kausche |
| 3,161,176 A | 12/1964 | Derry |
| 3,194,212 A | 7/1965 | Sauer |
| 3,195,513 A | 7/1965 | Billhorn |
| 3,245,383 A | 4/1966 | Priefert |
| 4,357,906 A | 1/1982 | Kratky |
| 4,517,924 A | 5/1985 | McCan |
| 4,531,478 A | 7/1985 | Forrest |
| 4,630,570 A | 2/1986 | Wilson |
| 5,158,041 A | 10/1992 | Schmitz |
| 5,626,100 A | 5/1997 | Stubbs |
| 5,706,763 A | 1/1998 | Trethewey |
| 5,908,009 A | 6/1999 | Cummings |

(Continued)

*Primary Examiner* — Joshua J Michener
*Assistant Examiner* — Henry Hooper Mudd
(74) *Attorney, Agent, or Firm* — Adrian D. Battison; Ade & Company Inc.; Ryan W. Dupuis

(57) ABSTRACT

An animal head gate includes head gate doors each having a squeeze bar to trap the neck mounted between upper and lower rails. Adjustment of the spacing between the bars uses an eccentric crank operated by lever which cooperates with two manual latches on a rail at maximum and minimum spacing. A neck sweep bar is mounted on one gate and movable from a retracted position to a position forward of the squeeze bar across the head gate so as to engage the neck of the animal in front of the squeeze bar and to turn the neck and head. The head gate is held closed by front and rear abutment members each of which is formed as a roller which rotates to reduce friction under load. Each gate includes an upstanding torsion bar which twists when forces are applied to the squeeze bars from impact with the animal.

17 Claims, 9 Drawing Sheets

(56) References Cited

U.S. PATENT DOCUMENTS

| | | |
|---|---|---|
| 11,202,440 B1 | 12/2021 | Bakko |
| 11,445,698 B2 | 9/2022 | Firth |
| 2003/0172881 A1 | 9/2003 | Dehod |
| 2005/0132978 A1 | 6/2005 | Bentz |
| 2006/0191492 A1 | 8/2006 | Ross |
| 2008/0308047 A1 | 12/2008 | Mollhagen |
| 2010/0083908 A1 | 4/2010 | Brown |
| 2012/0037090 A1 | 2/2012 | Manwaring |
| 2012/0192808 A1 | 8/2012 | Daniels |
| 2013/0098312 A1 | 4/2013 | Keong |
| 2015/0359233 A1 | 12/2015 | Callicrate |
| 2018/0116171 A1 | 5/2018 | Beavers |
| 2022/0071170 A1 | 3/2022 | McDonald |

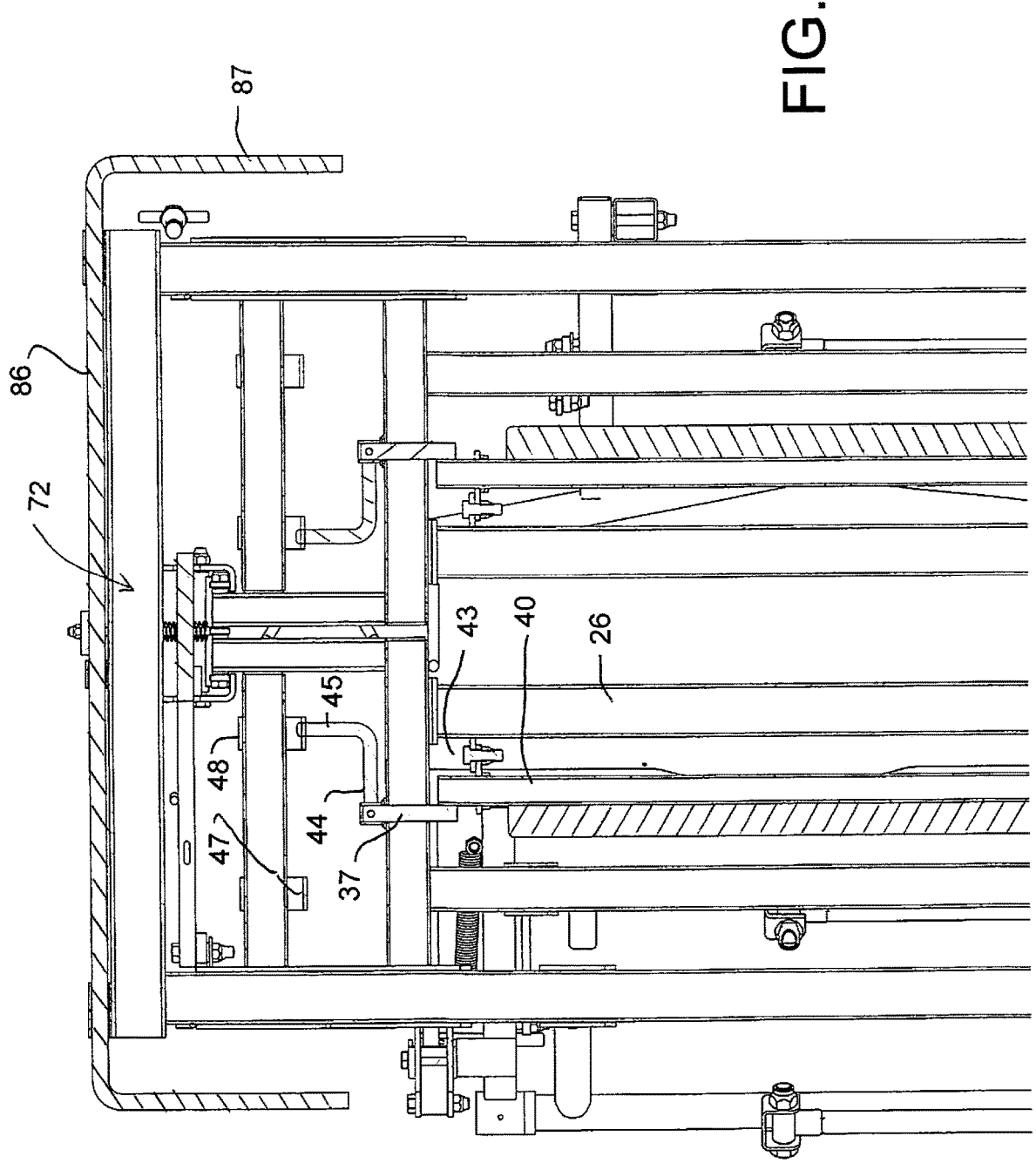

HEAD GATE FOR A CATTLE CONTAINMENT CHUTE

This invention relates to a head gate for a cattle containment chute where cattle are confined to pass in a row through a chute with a head gate at the end and to a head gate arrangement which can make it easier for the handler to control movement of the animal in the chute and to better contain the animal when engaged by the head gate.

BACKGROUND OF THE INVENTION

Squeeze chutes are well known and conventionally include a generally channel shaped frame structure having a head end for receiving a head of an animal to be confined, two sides each for extending along a respective side of the animal to be confined, a tail end remote from the head end. A head gate assembly at the head end is operable to move from a release position to a closed position in which the neck of the animal is grasped for confinement of the animal. In some cases, a squeeze side panel is arranged along one side both and is operable in a pivoting action to squeeze the animal from one side onto the other side panel so that the body of the animal is also confined. A tail gate section is often provided at the rear end to close behind the animal as it enters the squeeze chute.

The head gate typically comprises a pair of upstanding squeeze bars with a spacing between them sufficient to receive the neck of the animal without damage but insufficient for the head to be pulled out of the bars and insufficient for the animal to move forward. Each of the upstanding squeeze bars forms part of a head gate door which pivots about a vertical axis parallel to the upstanding squeeze bar and spaced outwardly of the bar. In the closed holding position the axis and the upstanding squeeze bars lie in a common plane transverse to the chute with the upstanding squeeze bars at their point of closest approach. In a set portion the bar pivots so that it moves along the chute toward the incoming animal with the frame inclined out of the common plane thus increasing the space between the bars.

Thus to catch the cattle by the head, it is common to have a head gate that locks by itself as the cattle try to walk through it. When set in the set catch position, the bars are turned toward the approaching cattle. The approaching animal will see an opening sufficient for its head and try to walk through. The head will fit through the opening, but as the animal tries to walk forward its shoulders hit the bars and the bars move forward with the shoulders until the bars hit a latch at a top of the head gate locking them in the catch or closed position in which the upstanding squeeze bars lie in the common plane. Normally head gate doors have a handle projecting out of the frame of one of the bars to one side of the chute which allows a worker standing to that side to push the handle to pivot the frame about its vertical axis that helps pivot the head gate to be closed.

Head gates have been manufactured in this construction for many years and many manufacturers have arrangements which operate effectively in this manner. It will be appreciated that the animals concerned are very large and strong with great ability to do damage to themselves and the worker. It is thus highly desirable that even highly recalcitrant animals are trapped in the head gate as quickly and simply as possible with little possibility to back up before being trapped.

SUMMARY OF THE INVENTION

The arrangement described herein provide a number of improvements over convention head gates.

A first improvement relates to a quick width adjustment where the upstanding squeeze bars can be adjusted relative to the respective head gate door so as to adjust the point of closest approach to accommodate animals of different sizes. this is particularly important where the animals approaching the head gate are of different sizes to that the operator can quickly change the spacing as the animal is in it approach to properly trap smaller animals while avoiding potential injury to the animal if the spacing is too small.

In accordance with this important feature, there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof; the head gate assembly comprising:

a support frame mounted on the frame structure at the head end;

a pair of head gate doors;

each head gate door having a respective upstanding squeeze bar for cooperating with a respective upstanding squeeze bar of the other of the doors to trap the neck of the animal therebetween;

each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

the upstanding squeeze bar of each head gate door being mounted at an upper end on the respective upper rail for adjustment movement toward and away from the pivot axis;

each head gate door having an adjustment device for causing said adjustment movement comprising:

an eccentric crank mounted on the upper rail rotatable about a crank axis transverse to the upper rail;

an upper link connecting the eccentric crank to the upstanding squeeze bar where rotation of the eccentric crank about the crank axis causes the upstanding squeeze bar to move toward and away from the pivot axis in said adjustment movement;

and a manually operable lever for driving rotation of the eccentric crank around the crank axis.

The eccentric crank operated by the lever therefore can rapidly and immediately adjust the bar of each door between two positions, thus providing three separate spacings defined by the bars being both in the closest positions, one being moved outwardly and both being in the widest positions. This quick adjustment can allow the skilled operator to select from the three positions that which is most suitable for the approaching animal so that the animal is properly confined without risk of injury to an animal which is too small or too large for the selected spacing.

According to a second definition of this arrangement there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof; the head gate assembly comprising:

a support frame mounted on the frame structure at the head end;

a pair of head gate doors;

each head gate door having a respective upstanding squeeze bar for cooperating with a respective upstanding squeeze bar of the other of the doors to trap the neck of the animal therebetween;

each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

the upstanding squeeze bar of each head gate door being mounted at an upper end on the respective upper rail for adjustment movement toward and away from the pivot axis;

each head gate door having an adjustment device for causing said adjustment movement comprising:

a manually operable lever movable between first and second positions;

a latch arrangement which latches said lever in said first and second positions;

and a link connection connecting the lever to the upstanding squeeze bar where movement of the lever causes the upstanding squeeze bar to move toward and away from the pivot axis in said adjustment movement.

Preferably there is provided therefore a latch arrangement for locating the lever in at least two adjustment positions of maximum and minimum spacing from the pivot axis.

Preferably the upstanding squeeze bar of each head gate door is mounted at a lower end on the respective lower rail for adjustment movement toward and away from the pivot axis; wherein each head gate door has a lower link mounted at the lower rail where causes the lower end of the upstanding squeeze bar to move toward and away from the pivot axis in said adjustment movement and wherein the manually operable lever includes a coupling for driving rotation simultaneously of the upper and lower links.

The eccentric crank arrangement is one preferred way in which a rotation of the lever causes a simple quick linear adjustment of the position of the squeeze bar. However other arrangements can be used.

Using this arrangement, adjustment can take place in some embodiments in as little as 2 seconds allowing the worker to adjust for the actual approaching animal in the stream of animals rather than to set up in advance which is necessary in prior art devices where adjustment can take up to several minutes.

Preferably the upstanding squeeze bar of each head gate door is mounted at a lower end on the respective lower rail for adjustment movement toward and away from the pivot axis; wherein each head gate door has a lower link mounted at the lower rail where rotation of the eccentric crank about the crank axis causes the lower end of the upstanding squeeze bar to move toward and away from the pivot axis in said adjustment movement and wherein the manually operable lever includes a coupling for driving rotation simultaneously of the upper and lower links. In this arrangement, preferably the coupling comprises a bar generally parallel to the upstanding squeeze bar.

Preferably the crank axis is upstanding so as to be generally parallel to the upstanding squeeze bar.

Preferably the manually operable lever includes an upstanding arm or handle allowing it to be easily grasped and which cooperates with a thumb operated latch on a rail of the respective head gate door parallel to and above the upper rail. In this way the operator can each up to the handle and quickly release it from its latch using thumb pressure and crank it around to a second position lying along the upper rail where it is engaged by a second latch. This avoids the use of conventional telescopic tubes and latching pins which are very slow and cumbersome.

Thus preferably the manually operable lever cooperates with first and second latches on a rail of the respective head gate door parallel to the upper rail and the manually operable lever is movable between first and second positions extending longitudinal of the upper rail and cooperates in said first and second positions with first and second latches on a rail of the respective head gate door parallel to the upper rail.

A second improvement relates to a neck sweep bar which is mounted on one of the head gate doors to move across in front of the associated squeeze bar so as sweep the head and front part of the neck of the animal across to one side to better expose one side of the neck and head for treatment for example by injection or for tagging.

In accordance with this important feature, there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof; the head gate assembly comprising:

a support frame mounted on the frame structure at the head end;

a pair of head gate doors;

each head gate door having a respective upstanding squeeze bar for cooperating with a respective upstanding squeeze bar of the other of the doors to trap the neck of the animal therebetween;

each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a first open position in which the respective upstanding squeeze bars are positioned on a side of the common plane facing the tail end to allow the head of the animal to enter and to a second open position in which the respective upstanding squeeze bars are positioned on a side of the common plane opposite the tail end to allow the animal to depart;

and an upstanding neck sweep bar mounted on a respective one of the head gate doors at a position in front of the head gate door and movable relative thereto from a retracted position to one side of the respective upstanding squeeze bar of the respective head gate door to an operating position forward of the respective upstanding squeeze bar of the head gate and spaced across the head gate to a greater distance than the respective upstanding squeeze bar of the respective head gate door so as to engage the neck of the animal in front of the respective upstanding squeeze bar of the respective head gate door and to turn the neck and head to a side opposite the respective head gate door;

a linkage mounting the neck sweep bar on the frame structure for pivotal movement between the retracted and extended positions;

and a manually operable lever for causing said pivotal movement of the linkage and thus the neck sweep bar.

Preferably the linkage includes a latch to hold the neck sweep bar at a plurality of positions relative to the respective head gate door. The latch can comprise a simple sliding friction lock which is infinitely adjustable to hold the neck sweep bar at the positions and can include a manually release to allow the neck sweep bar return to its retracted position when the animal is ready for release. It will be appreciated that the close confinement of the animal and particularly the head and neck acts to reduce stress leading to uncontained thrashing movements which can interfere with the treatment and particularly case broken injection needles which become embedded in the meat after slaughter.

Preferably the neck sweep bar is mounted for pivotal movement about the hinge support member of the respective head gate door and preferably there is provided a pivot link connected to the respective head gate door to guide movement of the neck sweep bar in an arc from a position to one side of the squeeze bar around in a sweeping action to a position aligned with and in front of the squeeze bar and beyond the squeeze bar to push the head and neck to one side as required.

Preferably the neck sweep bar cooperates with a neck holding bar on the other one of the head gate doors where the neck holding bar is located in front of the upstanding squeeze bar of the other of the head gate doors. Preferably the neck holding bar pivots relative to the upstanding squeeze bar of the other one of the head gate doors to a deployed position from a retracted position closer to the pivot axis. This avoids a situation where the space between the squeeze bars appears to the animal to be partly closed thus restricting the tendency to pass through between the squeeze bars. Thus the neck holding bar is retracted in the set position of the doors so that it is hidden from the animal until it is deployed as the animal moves the doors to the closed position.

That is, preferably the neck holding bar is automatically moved to the deployed position as the other one of the head gate doors is moved to the closed position. Preferably the neck holding bar is fixed in the deployed position and the neck sweep bar is movable to selected adjustable positions adjacent the neck holding bar depending on the size of the neck of the animal. In this way the holding bar locates one side of the neck and the sweep bar pushes the other side of the neck across the space between the squeeze bars to the required inclined position.

Preferably the neck sweep bar is not straight but includes a recess at around head height on the animal to restrict up and down movement when confined.

A further improvement relates to an improved latching arrangement where the head gate doors can more easily be released from the latched position, bearing in mind that the large animals involved can be applying heavy pressure forwardly or rearwardly to the gates when the release is required.

In accordance with this important feature, there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof; the head gate assembly comprising:

a support frame mounted on the frame structure at the head end;

a pair of head gate doors;

each head gate door having a respective upstanding squeeze bar for cooperating with a respective upstanding squeeze bar of the other of the doors to trap the neck of the animal therebetween;

each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

each head gate door including an engagement portion cooperating with a latching device for latching the head gate door in the closed position;

the latching device having a front abutment member for engaging a forward surface of the engagement portion to hold the engagement portion and thus the head gate door against movement to the forward open position and a rear abutment member for engaging a rearward surface of the engagement portion to hold the engagement portion and thus the head gate door against movement to the rearward open position;

the front abutment member being movable in a direction generally along the common plane to release the forward surface to allow movement of the head gate door to the forward open position;

the rear abutment member being movable in a direction generally along the common plane to release the rearward surface to allow movement of the head gate door to the rearward open position;

the front abutment member comprising a roller which rotators to roll over the forward surface;

the rear abutment member comprising a roller which rotators to roll over the rearward surface.

Preferably the front abutment member includes two separate rollers each for engaging respective one of the head gate doors the rear abutment member includes two separate rollers each for engaging respective one of the head gate doors.

Preferably the front abutment member and the rear abutment member are independently operable.

Preferably the front abutment member and the rear abutment member are operable manually.

Preferably the front abutment member and the rear abutment member are located at a top of head gate doors.

Preferably the engagement portion comprises an upstanding post.

Preferably the front abutment member and the rear abutment member are spring mounted so as to move to allow entry of the engagement portion therebetween.

Preferably the front abutment member is connected to a front lift roller for lifting the front abutment member when the head gate door moves toward the closed position and the rear abutment member is connected to a rear lift roller for lifting the rear abutment member when the head gate door moves toward the closed position.

Preferably there is provided a front manually operable member arranged to move the front abutment member to a raised position to release the head gate door and a rear manually operable member arranged to move the rear abutment member to a raised position to release the head gate door, the front and rear members being connected to a tilt mechanism to allow to move one or other to the raised position.

Preferably each of the head gate doors includes a hand grasp handle adjacent the front abutment member projecting forward from the head gate door.

Preferably each of the head gate doors includes a projecting bar above the respective upstanding squeeze bars extending across from the head gate door toward the other head gate door so as to prevent a part of the animal being pinched at the latching device.

A further improvement relates to the provision in the structure of each head gate door of a torsion bar which allows the head gate door to twist under impact loads to reduce forces on the animal which could cause injury.

In accordance with this important feature, there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof; the head gate assembly comprising:

a support frame mounted on the frame structure at the head end;

a pair of head gate doors;

each head gate door having a respective upstanding squeeze bar for cooperating with a respective upstanding squeeze bar of the other of the doors to trap the neck of the animal therebetween;

each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

the upstanding squeeze bar of each head gate door being loosely connected at an upper end thereof to the upper rail for movement relative to the upper rail;

the upstanding squeeze bar of each head gate door being loosely connected at a lower end thereof to the lower rail for movement relative to the lower rail;

a latching arrangement at a top of the head gate doors which locks the head gate doors in the closed position while bottom ends of head gate doors at the lower rails are free to pivot about the pivot axis;

and an upstanding torsion bar rigidly connected at an upper end to the upper rail and rigidly connected at a lower end to the lower rail;

the upstanding torsion bar being located between the upstanding squeeze bar and the hinge support member;

the upstanding torsion bar being arranged so as to twist when forces are applied to the upstanding squeeze bars from impact with the animal where the forces are communicated to the latching arrangement at the upper ends while the bottom ends pivot about the pivot axis.

Preferably the upstanding squeeze bar of each head gate door is loosely connected at the upper end thereof to the upper rail for sliding adjustment movement relative to the upper rail and the upstanding squeeze bar of each head gate door is loosely connected at a lower end thereof to the lower rail for sliding adjustment movement relative to the lower rail.

Preferably the torsion bar is welded to the upper and lower rails.

BRIEF DESCRIPTION OF THE DRAWINGS

One embodiment of the invention will now be described in conjunction with the accompanying drawings in which:

FIG. 9 is a cross sectional view of the width adjustment system of FIGS. 2 and 3.

In the drawings like characters of reference indicate corresponding parts in the different figures.

DETAILED DESCRIPTION

Figure 1:
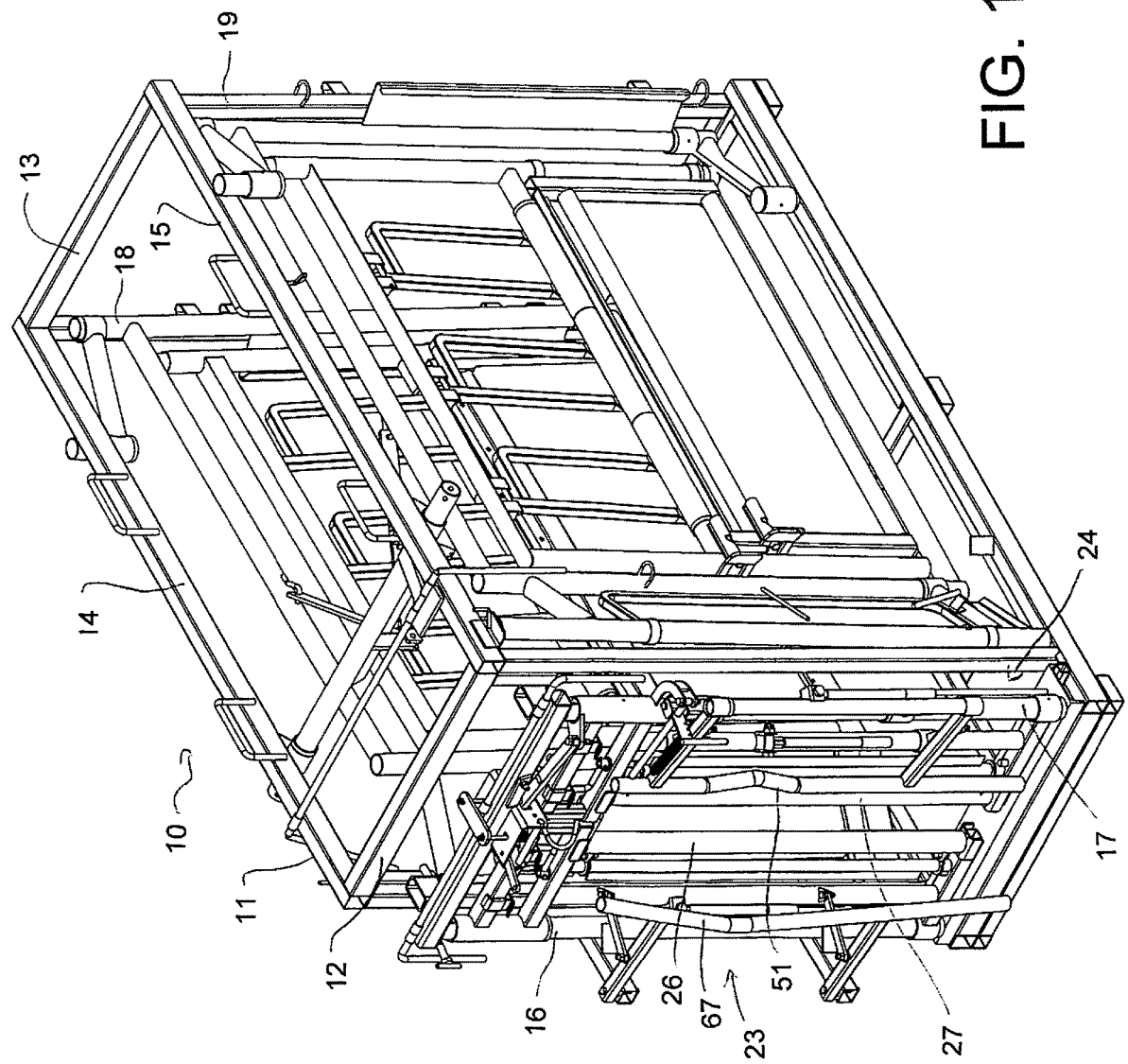
FIG. 1 is an isometric view of a cattle confinement chute including a head gate according to the present invention.

A squeeze chute generally indicated at 10 is formed by a frame structure 11 forming a front panel 20, a rear panel 13, a first side 14 and a second side 15. Each of the panels is formed by vertical posts so that the front panel includes posts 16 and 17 and the rear panel includes posts 18 and 19. The front and rear panels are connected by horizontal rails 12 and 21 at the top part of the frame forming a rigid channel shaped frame structure into which an animal to be confined can enter from the rear panel to a position between the side panels and rearwardly of the front panel.

The front panel includes a head gate assembly generally indicated at 22 including a first head gate door 23 and a second door 24 each of which is pivotally mounted for opening and closing movement around a vertical axis at or adjacent the post 16, 17 from a closed or confinement position shown in FIG. 1 to a receiving position in which the doors are pivoted to face inwardly and to the chute so that the animal pushes its head between the doors as it tries to escape out of the front of the squeeze chute with the animal automatically pushing the doors to the closed confinement position as it engages the doors. The doors can then be pivoted to a release position facing outwardly of the front of the squeeze chute in which the animal can escape when the confinement is no longer required.

As shown the doors are mounted for pivotal movement around axes 16A, 17A at or adjacent the vertical posts 16 and 17 on hinge collars 16B, 16C and 17A, 17B. A diagonal lever 10A is provided which connects the doors 23, 24 and ensures that the doors remain in synchronism so that if one door is pushed, both of the doors move into the required location. Each of the doors can be manually operated by levers 25A and 25B attached to the respective door which projects outwardly from the door toward the side of the squeeze chute. The levers can pivot downwardly as shown when not used. A handle at the end of the lever can be grasped to lift the lever allowing the worker to pivot the gate and thus synchronously the other gate from one position to another.

The pair of head gate doors 23 and 24 are arranged with each door having a vertical or upstanding squeeze bar 26, 27 for cooperating with the squeeze bar of the other of the doors to trap the neck of the animal therebetween. Each door is mounted on the hinge support member 16, 17 carried on the support frame for pivotal movement of the door and its vertical bar about a respective vertical pivot axis 16A, 17A generally parallel to the first vertical post member and spaced outwardly toward a respective side of the support frame 11.

The doors are movable from the closed position shown in which the squeeze bars lie in a common plane P (FIG. 5) including the pivot axes 16A, 17A to an open position in which the vertical bars are positioned on a side of the common plane P facing the rear end of the chute and the incoming animals to allow the head of the animal to enter between the bars while they are spaced apart.

The head gate assembly 22 at the head end at the front end is thus operable to move from an open position (not shown) to a closed position in which the neck of the animal is grasped for confinement between the squeeze bars 26, 27.

The head gate assembly comprises a support frame 28 mounted on the frame structure of the chute 10 at the head end or front end. The support frame is defined by the posts 16 and 17 which are connected at the top by a cross rail 30 and at the bottom by a cross rail 29.

The pair of head gate doors 23, 24 each have the respective upstanding squeeze bar 26, 27 for cooperating with a respective upstanding squeeze bar of the other of the doors to trap the neck of the animal therebetween. The bars are straight and parallel but other shapes are possible to better hold the head of the animal.

Each head gate door is pivotally mounted on its respective hinge support member defined by its respective post 16, 17 carried on the support frame 28 for pivotal movement of the door 23, 24 and its respective upstanding squeeze bar 26, 27 about its respective pivot axis 16A, 17A which is generally parallel to the respective upstanding squeeze bar and spaced outwardly toward a respective side of the support frame.

Each head gate door 23, 24 comprising an upper rail 31 welded to the collar 16C, 17C and a lower rail 32 welded to the collar 16B, 17B each mounted on the hinge support member 16, 17 for pivotal movement about the pivot axis 16A, 17A. The collars 16B and 16C are separate and hence can pivot independently around the respective post. The top rail 31 is connected to the bottom rail by a torsion bar 34 welded to both rails so that the structure defined by the top and bottom rails and the torsion bar lies in a common plane but can distort out of that plane under sufficient force.

The head gate doors are therefore movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart.

The upstanding squeeze bar 26, 27 of each head gate door is mounted at an upper end on the respective upper rail 31 for sliding adjustment movement toward and away from the pivot axis 16A, 17A. This mounting comprises a channel 35 in which the top rail 31 sits so that the channel can slide along the rail to change the distance of the squeeze bar from the pivot axis and thus from the squeeze bar of the other gate. Symmetrically the lower end of the squeeze bar is attached to the bottom rail 32 by an inverted channel 36 which sits on the bottom rail and can also slide longitudinally of the bottom rail. As the connection between the squeeze bar and the top and bottom rail is not rigid, the squeeze bar does not contribute to the rigidity of the head gate door so that this can flex as stated above by twisting of the torsion bar 34.

Each head gate door includes an adjustment device 37 for causing adjustment movement of the respective squeeze bar along the top and bottom rails.

Figure 3:
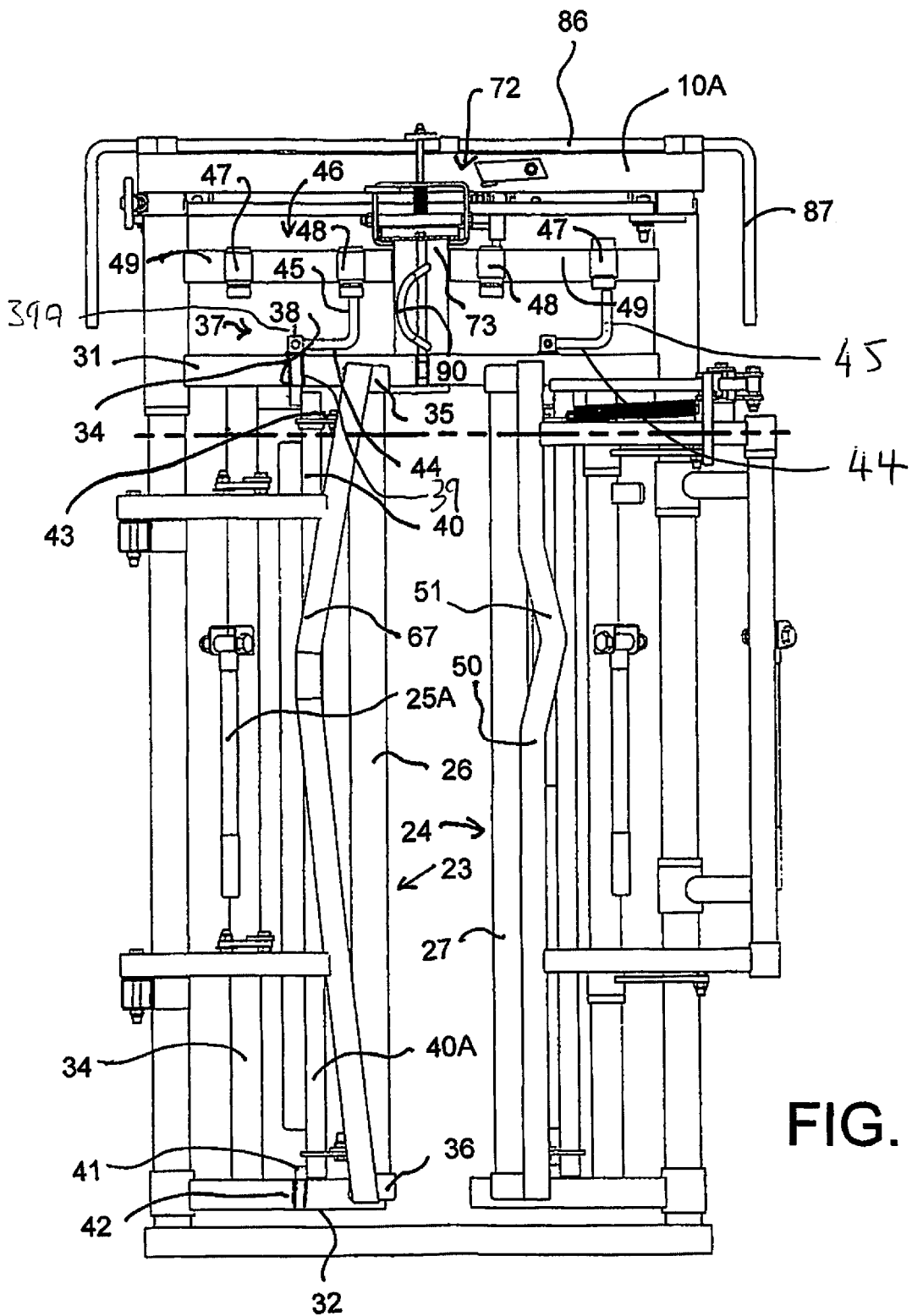
FIG. 3 is a front elevational view of the head gate of FIG. 1 in the closed position showing adjustment of the squeeze bar of one head gate door to a wider position.

Turning to FIG. 3, the adjustment device 37 comprises an eccentric crank 38 mounted on the upper rail 31 for rotation in a bushing 39 rotatable about an upstanding crank axis 39A transverse to the upper rail. The crank attaches to an upstanding connection rod 40 which is offset from the crank axis so that rotation of the crank around the bushing axis causes the connecting rod to rotate around the axis of the crank from the inward position shown on the left of FIG. 3 to the outward position shown on the right of FIG. 3. The lower end 40A of the coupling rod 40 is mounted in a symmetrical crank 41 carried in a bushing 42 attached to the bottom rail.

The coupling rod 40 is attached at the top and bottom to the squeeze bar by a pair of connected flanges 43 so that the lateral movement of the coupling bar is communicated to the squeeze bar 26 by the coupling bar with the squeeze bar held in lateral movement only along the rail by the channel coupling 35, 36.

In this way the coupling defined by the coupling rod 40 and the flanges 43 provides that rotation of the eccentric crank about the axis of its bushing causes the upstanding squeeze bar 26 to move toward and away from the pivot axis in the adjustment movement.

A manually operable lever 44 is provided for driving rotation of the eccentric crank around the crank axis. The lever 44 includes an upstanding handle 45 which can be readily grasped by the worker and moved between two positions as shown.

A latch arrangement 46 is provided for locating the handle 45 of the lever 44 in two adjustment positions of maximum and minimum spacing from the pivot axis 16A.

Symmetrically the upstanding squeeze bar of each head gate door is mounted at a lower end on the respective lower rail for adjustment movement toward and away from the pivot axis; and each head gate door has a lower link mounted at the lower rail where rotation of the eccentric crank 38 about the crank axis 39 causes the lower end of the upstanding squeeze bar 26, 27 to move toward and away from the pivot axis 16A, 17A in adjustment movement. The manually operable lever 44 includes the coupling bar 40 for driving rotation simultaneously of the upper and lower links where the coupling bar extends generally parallel to the upstanding squeeze bar. The manually operable lever cooperates with first and second latches 47, 48 mounted on a rail 49 of the respective head gate door parallel to the upper rail 31. Thus the manually operable lever 44 is movable between first and second positions extending longitudinal of the upper rail 31 and cooperates in the first and second positions with the first and second latches 47, 48 on the rail 49 fixed to the respective head gate door parallel to the upper rail and movable with the door. The latches are pivotally mounted on the rail so that the thumb of the worked can be applied to one end of the latch thus releasing the other end from holding the upper end of the handle 45 in the respective latched position. In this way the worked can instantly switch the latch lever from one position to the other to change the spacing between the squeeze bars for animals of different size.

Figure 4:
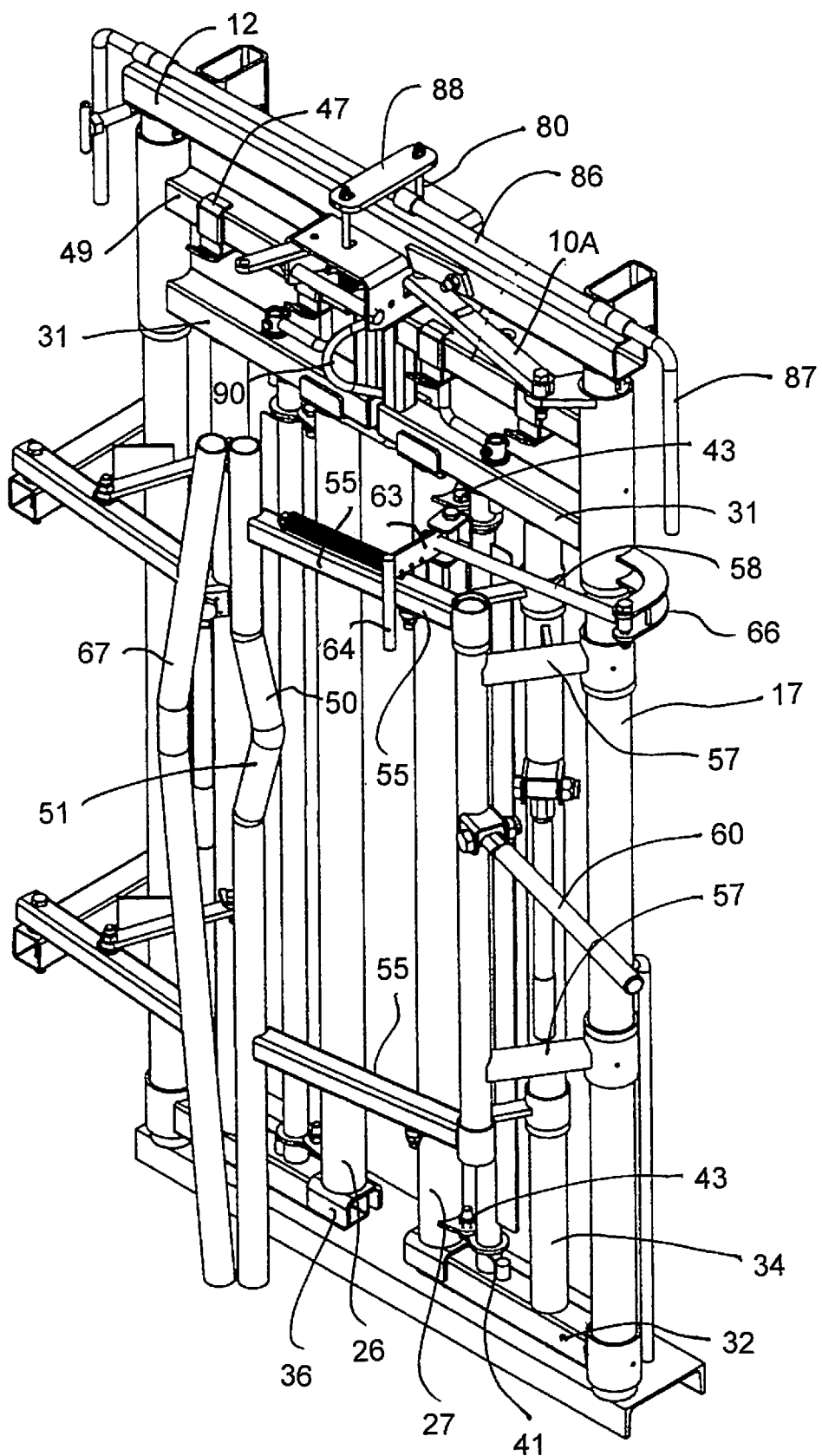
FIG. 4 is an isometric view of the head gate of FIG. 1.
Figure 5:
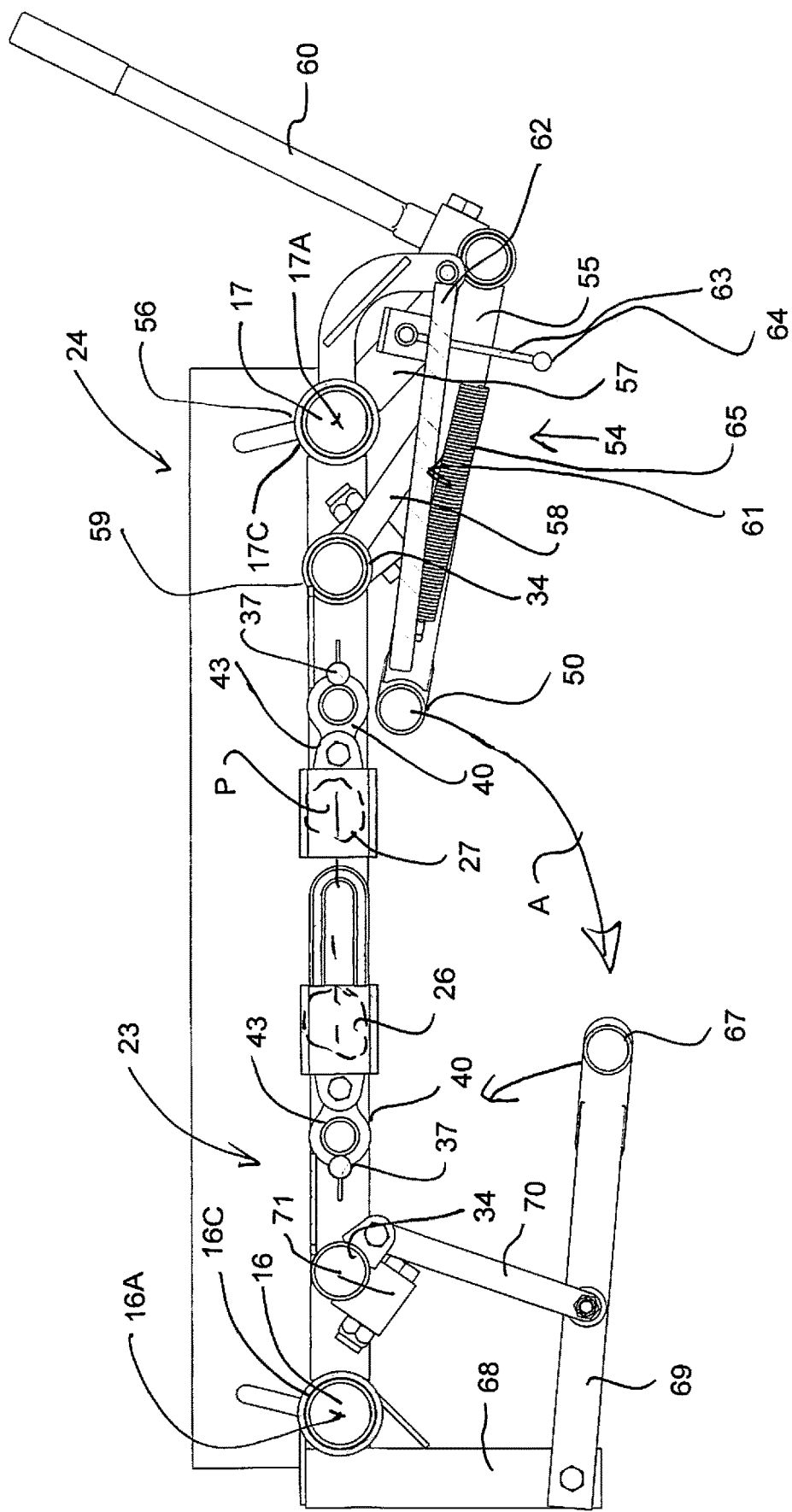
FIG. 5 is a cross sectional view of the head gate along the lines 5-5 of FIG. 2.
Figure 6:
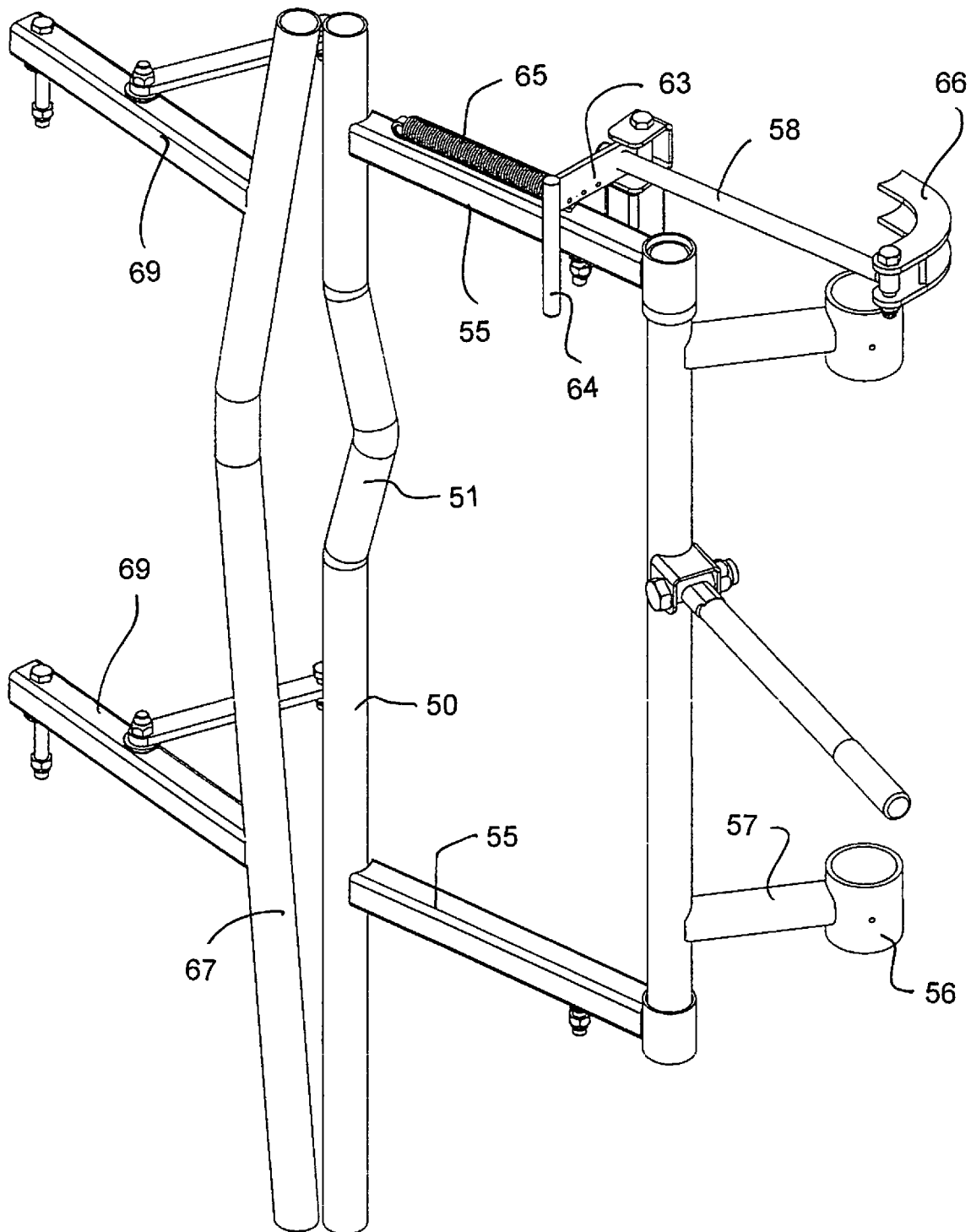
FIG. 6 is an isometric view of the neck sweep system of the head gate of FIG. 1.

Turning now to FIGS. 4, 5 and 6 there is shown an upstanding neck sweep bar 50 mounted on the head gate door 24 at a position in front of the head gate door 24 and movable relative thereto from a retracted position to one side of the upstanding squeeze bar 27 of the head gate door 24 to an operating position forward of the upstanding squeeze bar 27 of the head gate 24. The neck sweep bar 50 extends generally parallel to the squeeze bar 27 and has a height generally matching the bar 27. The bar 50 is generally straight but can include a recessed notch 51 at the height of the head of the animal be engaged.

The bar 50 in its operating position shown in FIGS. 4 and 6 is spaced across the head gate to a greater distance than the squeeze bar 27 of the head gate door 24 so as to engage the neck of the animal in front of the squeeze bar 27 and to turn the neck and head to a side opposite the head gate door 24 toward the head gate door 23.

The retracted position is shown in FIG. 5 where the bar 50 is retracted inwardly of the squeeze bar 27 so that it has no influence on the animal approaching from the rear. When the animal is engaged between the bars 26 and 27, the neck sweep bar can be deployed from the retracted position in an arc A to the operating position.

A linkage 54 mounts the neck sweep bar on the frame structure for pivotal movement between the retracted and extended positions and includes a lever 55 carried on cranks 57 and 58 which guide the motion and create the arc A between the retracted and deployed positions. The crank 57 is attached to a collar 56 mounted in the post 17 for rotation around the axis 17A. The crank 58 is mounted on a collar 59 carried on the torsion bar 34. The lever 55 is operable by a handle 60 so that rotation of the handle in a clockwise direction causes movement in the deployment direction.

The mounting linkage includes a latch to hold the neck sweep bar at a selected one of plurality of positions relative to the head gate door where the latch comprises a rod 62 sliding through a hole in a plate 63 acting as a friction lock to hold the neck sweep bar at the required position and where the plate includes a manually operable release handle 64 to allow the neck sweep bar return to the retracted position driven by a spring 65.

In this way the neck sweep bar is mounted for pivotal movement about the hinge support member 17 of the head gate door 24. The rod 58 is carried on a bracket 66 which allows the rod to follow the required path to act as a friction lock on the movement of the sweep bar 51.

The neck sweep bar 50 cooperates in holding the neck with a neck holding bar 67 on the other head gate door 23. That is the neck holding bar 67 of the gate 23 is deployed to a position in front of the squeeze bar 26 of the gate 23 and then remains fixed as the operator actuates the neck sweep bar 50 to a required position using the handle 60. The required position will vary depending on the animal and the required treatment using the skill of the worker to properly locate the head and neck of the animal in the sweeping action. The friction lock 61 then holds the bar 50 in place until the treatment is complete.

The neck holding bar 67 is mounted on arms 68 projecting forwardly from the post 16 and pivots relative to an outer end the arms 68 on pivot arms 69. Thus the neck holding bar is automatically moved to the deployed position as shown in front of the squeeze bar 26 as the head gate door 23 is moved to the closed position by a link 70 extending from the arm 69 to the gate 23 at a coupling 71 on the torsion bar 34.

In this way the neck holding bar 67 is fixed in the deployed position and the neck sweep bar 50 is movable to selected adjustable positions adjacent the neck holding bar depending on the size of the neck of the animal.

The neck holding bar 67 is bowed from top to bottom so that the animal is fairly free to raise and lower its head when engaged. However the notch 51 is used to engage the other side of the neck and to more specifically locate the height of the head and neck when engaged for treatment.

The swinging movement in the arc A is under control of the worker who can apply the necessary pressure and speed to the movement to bring the head to the required location without injury. The entrapment of the head and neck in this way reduces the tendency of the animal to struggle with danger to itself and the worker and the equipment.

Figure 7:
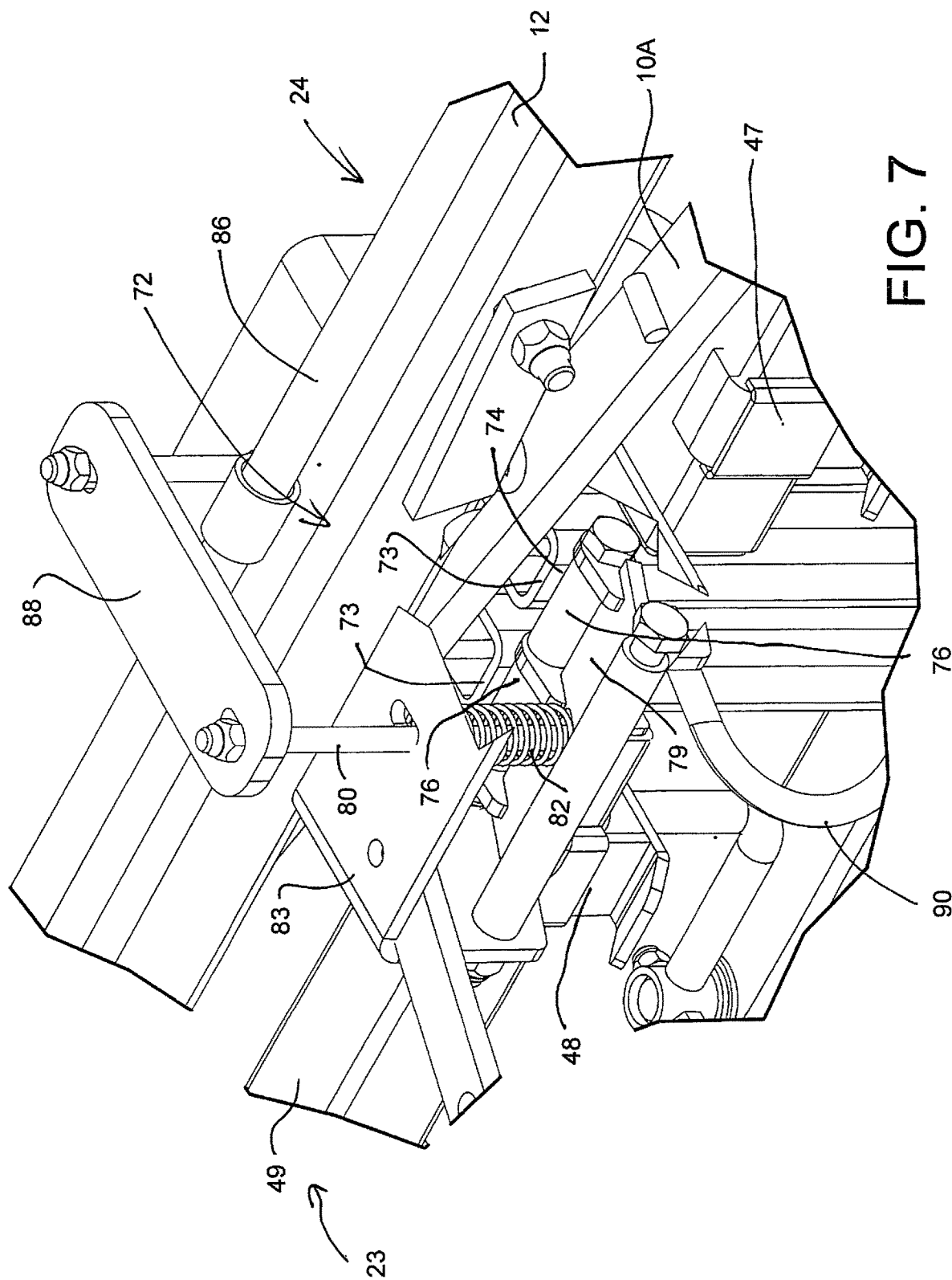
FIG. 7 is an isometric view of an upper part of the head gates showing the latching arrangement.
Figure 8:
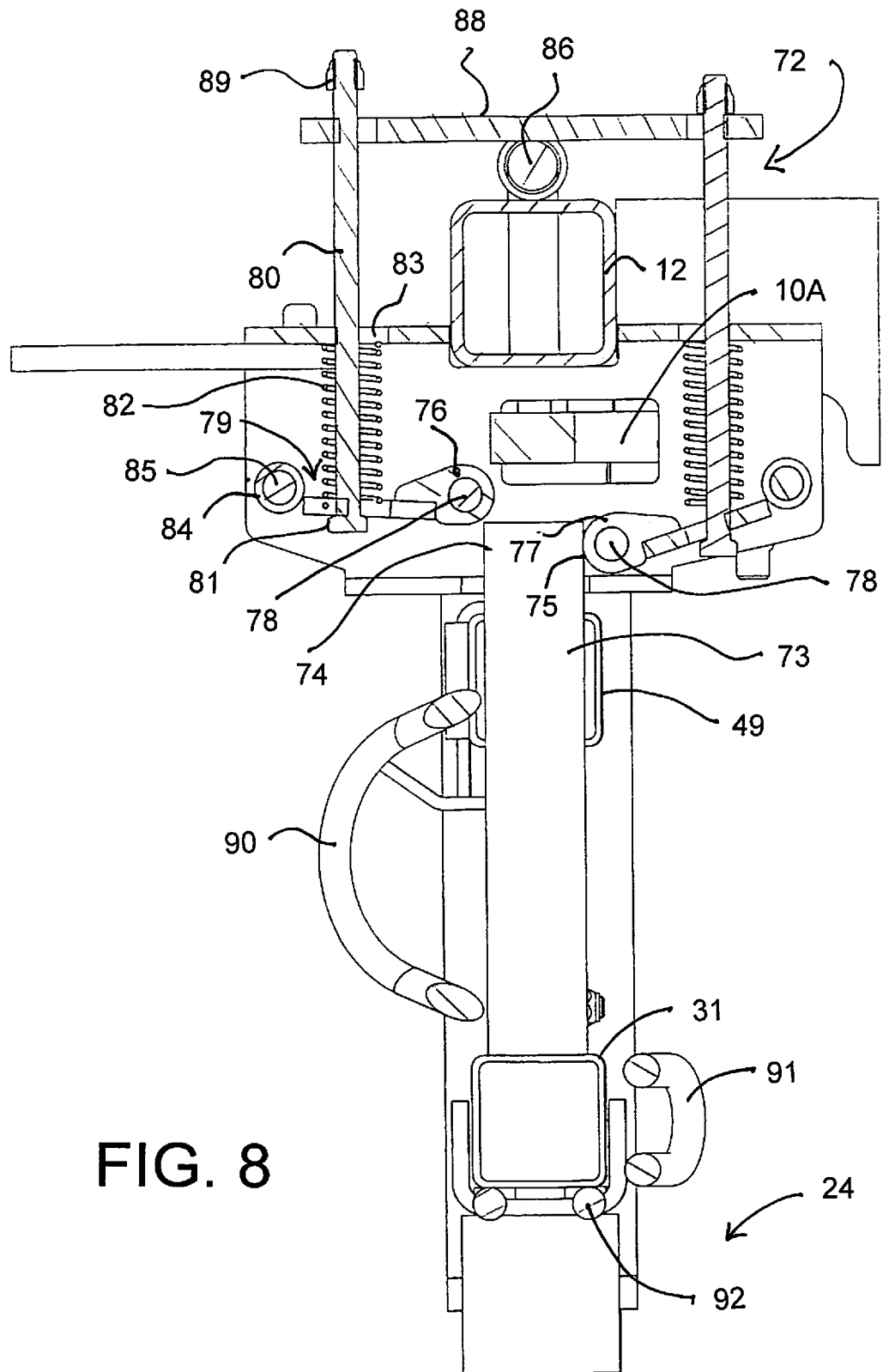
FIG. 8 is a cross sectional view of the latching arrangement of FIG. 7.

Turning now to FIGS. 7 and 8, there is shown the latching arrangement 72 which holds the gates 23 and 24 in the closed position and can be released to allow the gates to move forwardly to the release position or rearwardly to the set position as required.

Thus each head gate door 23,24 includes an engagement portion in the form of an upstanding post 73 with a front face 74 and a rear face 75 standing up beyond the top of the gate for cooperating with the latching device 72 for latching the head gate door in the closed position.

The latching device has a front abutment roller 76 for engaging the forward surface 74 of the post 73 to hold the post and thus the head gate door against movement to the forward open position. The latching device has a rear abutment roller 77 for engaging the rearward surface 75 of the post 73 to hold the post and thus the head gate door against movement to the rearward open position;

The front abutment roller and the rear abutment roller are each movable in an upward direction generally along the common plane containing the surfaces of the post to release the surface 74 and 75 to allow movement of the head gate door forwardly or rearwardly.

The fact that each of the abutment rollers 76, 77 can rotate on a mounting shaft allows the surface of the roller to roll over the surfaces 74 or 75 as required to reduce friction and allow easy release even when heavily laden by forces from the animal.

The front abutment member of the latch includes two separate rollers 76 each for engaging respective post 73 of the respective head gate doors 23 and 24. Similarly the rear abutment member of the latch includes two separate rollers 77 each for engaging respective one of the head gate doors. In this way the forces are further reduced as each roller 76 is free to rotate independently to release its door from the closed position.

The front abutment member including the rollers 76 is carried on a support plate 79 carrying the shaft 78. The plate 79 is carried on a lower end 81 of a pin 80 which is biased downwardly into a latched position by a spring 82. The pin 80 passes through a hole in a support plate 83 attached to the top rail 12 of the fixed frame of the chute 10. A lift roller 84 is carried on a shaft 85 attached to the plate 79 of the front abutment. This roller engages the post 73 of the door as it moves rearwardly from an open position toward the closed position. Thus the lift roller 84 lifts the abutment roller 76 to allow the post 73 to move under the roller 76 into position causing compression of the spring 82 as the plate 79 moves upwardly. Once the post passes the roller 76, the roller drops down into engagement position latching the post 73 against forward movement. As the roller 77 is already in place, the post and thus the door is latched.

The rear abutment including the roller 77 is exactly symmetrical so that further explanation is not required.

The rollers 76 and 77 are lifted when required by a rotating shaft 86 which is rotated about its axis by a handle 87 on either side of the chute 10. Rotation of the shaft 86 acts to tilt an operating plate 88 to one side of the other. The plate 88 engages an upper head 89 of the pin 80 acting to lift the pin and therefore the rollers 76. As the plate 88 is tilted one way or the other by the handle 87, the operator has control over whether the gate opens either forwardly or rearwardly.

The key feature of the latching system is the provision of the rollers 76 and 77 engaging he surfaces of the post which roll to allow the door to be released even when under heavy pressure from the animal pushing forwardly or pulling rearwardly in an attempt to escape.

In order to better control opening and closing of the gates without danger to the worker or the animal, each of the head gate doors includes a hand grasp handle in the form of a loop 90 welded to the post 73 of the rood 24 at a position adjacent the front abutment member projecting forward from the head gate door. This extends from its ends at one post 73 across the gap between the posts 73 in front of the gap to provide a convenient and safe engagement point for the worker to grasp the gate manually to pull.

In addition, each of the head gate doors at its rail 31 includes a projecting bar 91, 92 above the respective upstanding squeeze bars extending across from the head gate door toward the other head gate door so as to prevent the nose of the animal being pinched at the latching device.

Figure 2:
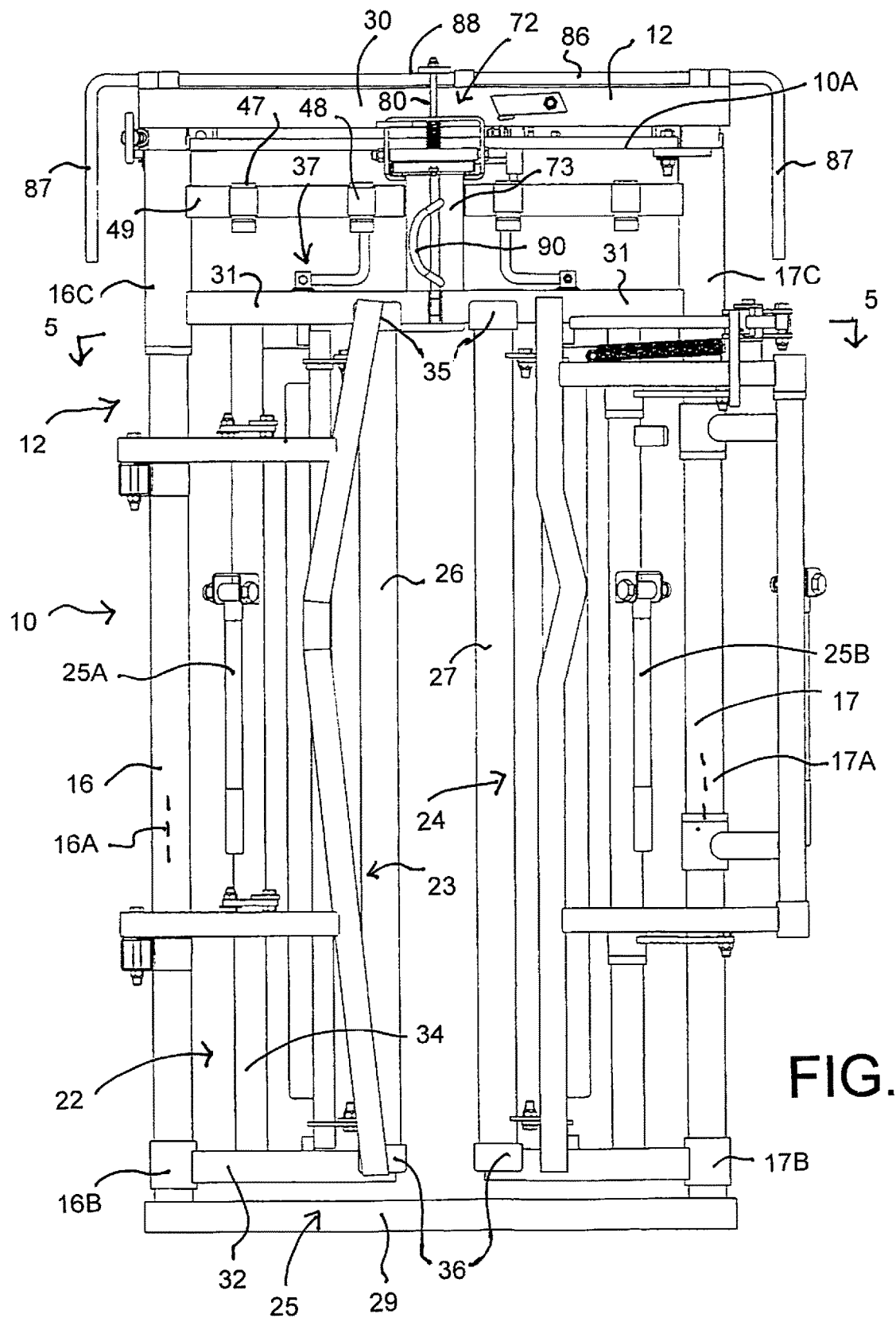
FIG. 2 is a front elevational view of the head gate of FIG. 1 in the closed position.

Turning back to FIG. 2, it has previously been described that the upstanding squeeze bar 26, 27 of each head gate door 23, 24 is loosely connected at an upper end 35 thereof to the upper rail 31 for movement relative to the upper rail and at a lower end 36 thereof to the lower rail 32 for movement relative to the lower rail. Further there is provided an upstanding torsion bar 34 rigidly connected at an upper end to the upper rail 31 and rigidly connected at a lower end to the lower rail 32 with the upstanding torsion bar 34 being located between the upstanding squeeze bar 26 and the hinge support member 16. In this way, the upstanding torsion bar is arranged so as to twist when forces are applied to the upstanding squeeze bars 76 and 77 from impact with the animal where the forces are communicated to the latching arrangement 72 located at the upper ends while the bottom ends of the posts 26 and 27 pivot about the pivot axis. The torsion bar is welded to the upper and lower rails but can twist and flex so that the bottom rails 32 can pivot forwardly by a distance as much as 4 inches while the upper rail remains fixed with this amount of movement providing significant spring action to reduce the loading on the animal as it impacts the bars 26 and 27.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense

The invention claimed is:
1. An animal confinement apparatus comprising:
 a generally channel shaped frame structure having a head end for receiving a head of an animal to be confined, two sides each for extending along a respective side of the animal to be confined, a tail end remote from the head end;
 a head gate assembly at the head end operable to move from an open position to a closed position in which the neck of the animal is grasped for confinement thereof;
 the head gate assembly comprising:
  a support frame mounted on the frame structure at the head end;
  a pair of head gate doors;
  each head gate door having a respective upstanding squeeze bar for cooperating with a respective upstanding squeeze bar of the other of the doors to trap the neck of the animal therebetween;
  each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;

each head gate door comprising an upper rail and a lower rail each connected to the hinge support member for pivotal movement about the pivot axis;

the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

each head gate door including an engagement portion cooperating with a latching device for latching the head gate door in the closed position;

the latching device having a front abutment member for engaging a forward surface of the engagement portion to hold the engagement portion and thus the head gate door against movement to the forward open position and a rear abutment member for engaging a rearward surface of the engagement portion to hold the engagement portion and thus the head gate door against movement to the rearward open position;

the front abutment member being movable in a direction generally along the common plane to release the forward surface to allow movement of the head gate door to the forward open position;

the rear abutment member being movable in a direction generally along the common plane to release the rearward surface to allow movement of the head gate door to the rearward open position;

the front abutment member comprising a roller which rotates to roll over the forward surface;

the rear abutment member comprising a roller which rotates to roll over the rearward surface.

2. The apparatus according to claim 1 wherein the front abutment member includes two separate rollers each for engaging respective one of the head gate doors the rear abutment member includes two separate rollers each for engaging respective one of the head gate doors.

3. The apparatus according to claim 1 wherein the front abutment member and the rear abutment member are independently operable.

4. The apparatus according to claim 1 wherein the front abutment member and the rear abutment member are operable manually.

5. The apparatus according to claim 1 wherein the front abutment member and the rear abutment member are located at a top of head gate doors.

6. The apparatus according to claim 1 wherein the engagement portion comprises an upstanding post.

7. The apparatus according to claim 1 wherein the front abutment member and the rear abutment member are spring mounted so as to move to allow entry of the engagement portion therebetween.

8. The apparatus according to claim 1 wherein the front abutment member is connected to a front lift roller for lifting the front abutment member when the head gate door moves toward the closed position and the rear abutment member is connected to a rear lift roller for lifting the rear abutment member when the head gate door moves toward the closed position.

9. The apparatus according to claim 1 wherein there is provided a manually operable member arranged to move the front abutment member to a raised position to release the head gate door and arranged to move the rear abutment member to a raised position to release the head gate door, the front and rear members being connected to a tilt mechanism to allow to move one or other to the raised position.

10. The apparatus according to claim 1 wherein each of the head gate doors includes a hand grasp handle adjacent the front abutment member projecting forward from the head gate door.

11. The apparatus according to claim 1 wherein each of the head gate doors includes a projecting bar above the respective upstanding squeeze bars extending across from the head gate door toward the other head gate door so as to prevent a part of the animal being pinched at the latching device.

12. The apparatus according to claim 1 wherein the upstanding squeeze bar of each head gate door is loosely connected at an upper end thereof to the upper rail for movement relative to the upper rail, wherein the upstanding squeeze bar of each head gate door is loosely connected at a lower end thereof to the lower rail for movement relative to the lower rail and wherein there is provided an upstanding torsion bar rigidly connected at an upper end to the upper rail and rigidly connected at a lower end to the lower rail arranged so as to twist when forces are applied to the upstanding squeeze bars from impact with the animal where the forces are communicated to the latching arrangement at the upper ends while the bottom ends pivot about the pivot axis.

13. The apparatus according to claim 12 wherein the upstanding squeeze bar of each head gate door is loosely connected at the upper end thereof to the upper rail for sliding adjustment movement relative to the upper rail and the upstanding squeeze bar of each head gate door is loosely connected at a lower end thereof to the lower rail for sliding adjustment movement relative to the lower rail.

14. The apparatus according to claim 12 wherein the torsion bar is welded to the upper and lower rails.

15. An animal confinement apparatus comprising:
a generally channel shaped frame structure having a head end for receiving a head of an animal to be confined, two sides each for extending along a respective side of the animal to be confined, a tail end remote from the head end;
a head gate assembly at the head end operable to move from an open position to a closed position in which the neck of the animal is grasped for confinement thereof;
the head gate assembly comprising:
a support frame mounted on the frame structure at the head end;
a pair of head gate doors;
each head gate door having a respective upstanding squeeze bar for cooperating with a respective upstanding squeeze bar of the other of the doors to trap the neck of the animal therebetween;
each head gate door being mounted on a hinge support member carried on the support frame for pivotal movement of the door and its respective upstanding squeeze bar about a respective pivot axis generally parallel to the respective upstanding squeeze bar and spaced outwardly toward a respective side of the support frame;
each head gate door comprising an upper rail and a lower rail each connected to the hinge support member for pivotal movement about the pivot axis;
the head gate doors being movable from a closed position in which the respective upstanding squeeze bars lie in a common plane including the pivot axes to a rearward open position in which the respective upstanding squeeze bars are positioned on a side of the common plane facing the tail end to allow the head of the animal to enter and to a forward open position in which the respective upstanding squeeze bars are positioned on a side of the common plane opposite the tail end to allow the animal to depart;

the upstanding squeeze bar of each head gate door being loosely connected at an upper end thereof to the upper rail for movement relative to the upper rail;

the upstanding squeeze bar of each head gate door being loosely connected at a lower end thereof to the lower rail for movement relative to the lower rail;

a latching arrangement at a top of the head gate doors which locks the head gate doors in the closed position while bottom ends of head gate doors at the lower rails are free to pivot about the pivot axis;

and an upstanding torsion bar rigidly connected at an upper end to the upper rail and rigidly connected at a lower end to the lower rail;

the upstanding torsion bar being located between the upstanding squeeze bar and the hinge support member;

the upstanding torsion bar being arranged so as to twist when forces are applied to the upstanding squeeze bars from impact with the animal where the forces are communicated to the latching arrangement at the upper ends while the bottom ends pivot about the pivot axis.

16. The apparatus according to claim 15 wherein the upstanding squeeze bar of each head gate door is loosely connected at the upper end thereof to the upper rail for sliding adjustment movement relative to the upper rail and the upstanding squeeze bar of each head gate door is loosely connected at a lower end thereof to the lower rail for sliding adjustment movement relative to the lower rail.

17. The apparatus according to claim 15 wherein the torsion bar is welded to the upper and lower rails.

* * * * *